(12) United States Patent
Furness et al.

(10) Patent No.: US 8,583,330 B2
(45) Date of Patent: Nov. 12, 2013

(54) VEHICLE CAR WASH MODE

(75) Inventors: Mary Beth Furness, Ann Arbor, MI (US); Kenneth J. Buslepp, Brighton, MI (US)

(73) Assignee: GM Global Technology Operations LLC, Detroit, MI (US)

(*) Notice: Subject to any disclaimer, the term of this patent is extended or adjusted under 35 U.S.C. 154(b) by 57 days.

(21) Appl. No.: 13/245,952

(22) Filed: Sep. 27, 2011

(65) Prior Publication Data
US 2013/0079998 A1    Mar. 28, 2013

(51) Int. Cl.
*B60R 1/074* (2006.01)
*B60J 1/17* (2006.01)
*B60S 1/08* (2006.01)
*H01Q 1/10* (2006.01)

(52) U.S. Cl.
CPC . *B60R 1/074* (2013.01); *B60J 1/17* (2013.01); *B60S 1/0818* (2013.01); *H01Q 1/103* (2013.01)
USPC .............................................. 701/49; 701/36

(58) Field of Classification Search
CPC .... H01Q 1/103; H01Q 1/3275; B60S 1/0818; B60R 1/074; B60R 3/02
USPC .......................................... 701/49; 340/686.6
See application file for complete search history.

(56) References Cited

U.S. PATENT DOCUMENTS

| 6,488,113 B1* | 12/2002 | Worpell et al. | 180/410 |
| 2002/0140387 A1* | 10/2002 | Gorsick | 318/445 |
| 2009/0128352 A1* | 5/2009 | Urick | 340/686.6 |

* cited by examiner

*Primary Examiner* — James Trammell
*Assistant Examiner* — Todd Melton
(74) *Attorney, Agent, or Firm* — Cantor Colburn LLP

(57) ABSTRACT

A method of controlling a vehicle is provided. The method includes determining a current car wash mode from a plurality of car wash modes; and controlling at least one vehicle component based on the car wash mode.

20 Claims, 4 Drawing Sheets

VEHICLE CAR WASH MODE

FIELD OF THE INVENTION

The subject invention relates to methods, systems and computer program products for automatically preparing a vehicle for a car wash.

BACKGROUND

Damage to a vehicle can occur during a car wash. For example, vehicle components that extend from the vehicle such as mirrors, window wipers, and antennas can break from the pressure of the wash. To prevent damage, the components can be retracted during a car wash. Other components, such as running boards are typically retracted during a car wash. This prevents the components from being cleaned during the car wash.

Accordingly, it is desirable to provide methods and systems for automatically protecting components of a car wash while ensuring that they can be cleaned.

SUMMARY OF THE INVENTION

In one exemplary embodiment, a method of controlling a vehicle is provided. The method includes determining a current car wash mode from a plurality of car wash modes; and controlling at least one vehicle component based on the car wash mode.

In another exemplary embodiment, a vehicle control system for a car wash is provided. The system includes a first module that determines a current car wash mode from a plurality of car wash modes. A second module controls at least one vehicle component based on the car wash mode.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
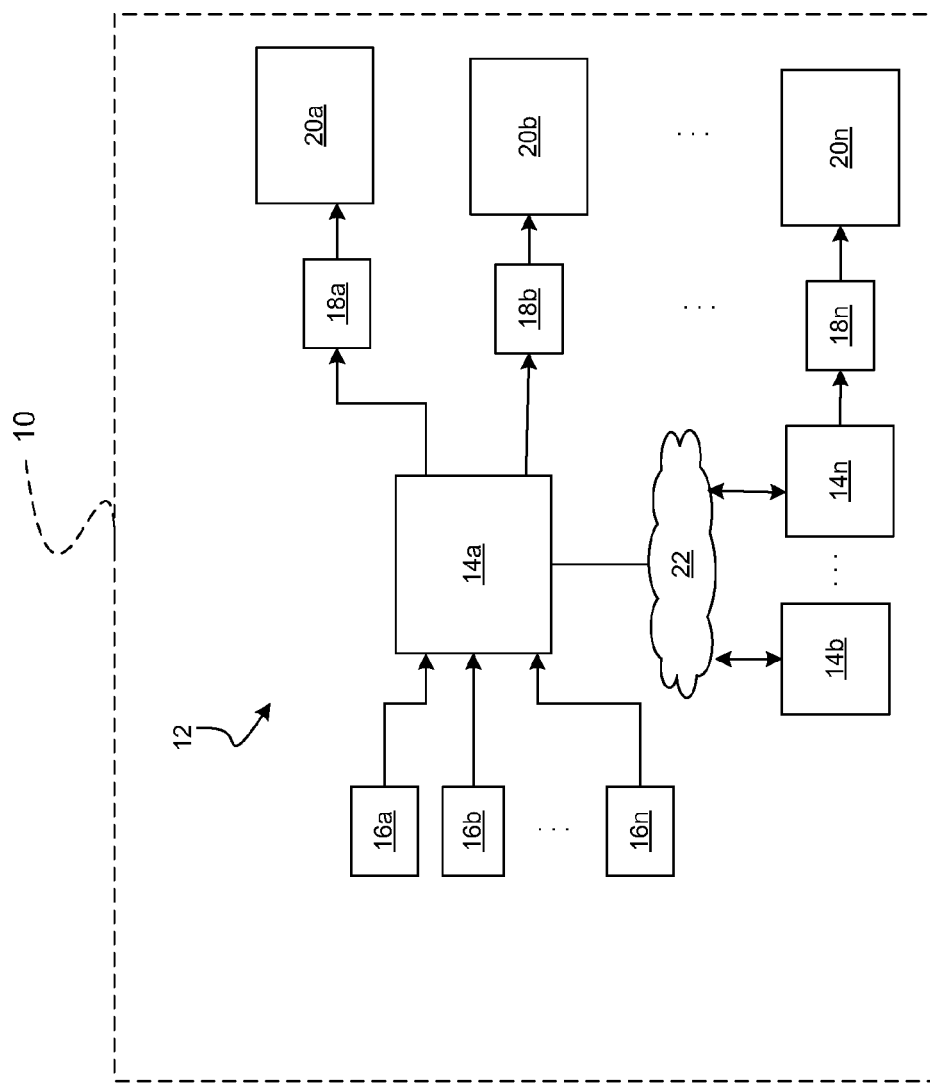
FIG. 1 is a functional block diagram of a vehicle that includes a car wash control system in accordance with exemplary embodiments.

The following description is merely exemplary in nature and is not intended to limit the present disclosure, its application or uses. It should be understood that throughout the drawings, corresponding reference numerals indicate like or corresponding parts and features.

In accordance with exemplary embodiments, a car wash system for a vehicle 10 is shown generally at 12 of FIG. 1. Generally speaking, the car wash system 12 provides methods and systems for automatically detecting when the vehicle 10 is going through a car wash and for controlling vehicle components during the car wash, such that they can be protected and/or cleaned. In various embodiments, the car wash system 12 can be configured by the driver or other occupant of the vehicle 10.

With particular reference now to FIG. 1, the vehicle 10 includes one or more control modules 14a-14n. As used herein, the term module refers to an application specific integrated circuit (ASIC), an electronic circuit, a processor (shared, dedicated, or group) and memory that executes one or more software or firmware programs, one or more software or firmware programs, a combinational logic circuit, and/or other suitable components that provide the described functionality.

At least one of the control modules includes the car wash control system (hereinafter referred to as the main control module 14a). The main control module 14a communicates with one or more vehicle sensors 16a-16n, one or more actuators 18a-18n, and/or one or more of the other control modules 14b-14n of the vehicle 12. For example, the main control module 14a can receive sensor signals from the vehicle sensors 16a-16n, and/or can receive messages from the other control modules 14b-14n via a vehicle network 22. The vehicle network 22 can include any combination of wired or wireless communication channels. For example, the vehicle network 22 can include a single communication bus or a combination of various communication buses that are implemented according to vehicle communication network standards, such as, for example, Controller Area Network (CAN), Society of Automotive Engineers (SAE) J1850, and General Motors Local Areal Network (GMLAN), etc.

The main control module 14a can generate control signals to the one or more actuators 18a-18n; and/or can generate messages to the other control modules 14b-14n via the vehicle network 22. The control signals and/or messages are generated to control one or more vehicle components 20a-20n based on a car wash mode. The vehicle components 20a-20b can be, but are not limited to, mirrors, windshield wipers, antennas, running boards, etc. The car wash mode can be, for example, entering a car wash, exiting a car wash, in a car wash, not in a car wash, or any other intermediate mode. The control of the vehicle components 20a-20n can depend on whether the vehicle component 20a-20n should be protected during the car wash or cleaned during the car wash.

Figure 2:
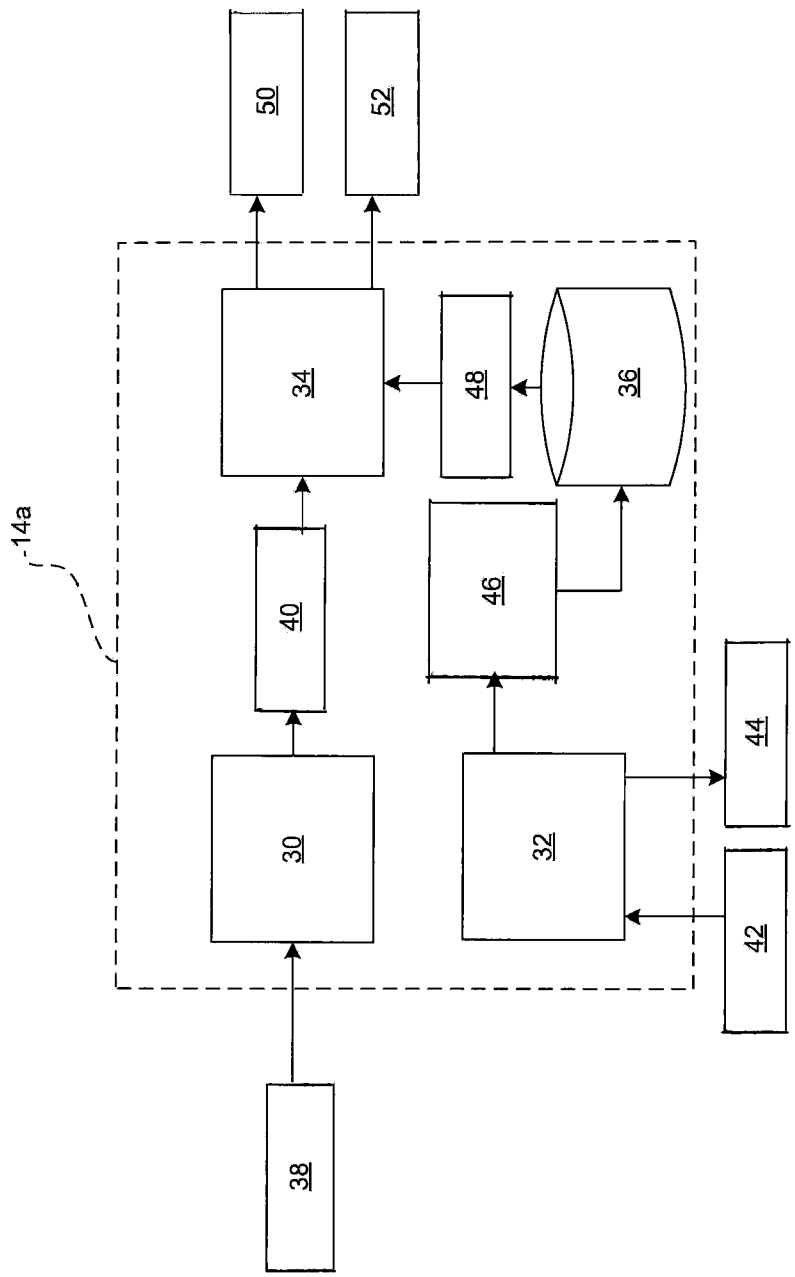
FIG. 2 is a dataflow diagram illustrating the car wash control system in accordance with exemplary embodiments.

Referring now to FIG. 2, a dataflow diagram illustrates embodiments of the control module 14a of FIG. 1. In various embodiments, the control module 14a can include one or more sub-modules and datastores. As can be appreciated, the sub-modules shown in FIG. 2 can be combined and/or further partitioned to automatically determine a car wash mode and to control the one or more vehicle components 20a-20n (FIG. 1) based on the mode. Inputs to the control module 14a can be generated from the sensors 16a-16n (FIG. 1) of the vehicle 10 (FIG. 1), can be received from the other control modules 14b-14n within the vehicle 10 (FIG. 1), can be modeled, and/or can be predefined. In various embodiments, at least one of the control modules 14b can include a telematics system that receives vehicle positioning data or other data from, for example, a remote location (e.g., from a satellite, tower, etc.).

In various embodiments, the main control module 14a includes a car wash automatic detection module 30, a user configuration module 32, a component control module 34, and a parameters datastore 36. The car wash automatic detection module 30 receives as input vehicle data 38. In various embodiments, the vehicle data 38 can include on onboard vehicle data such as, but not limited to, power mode, transmission range, vehicle speed, and sensor data. The power mode can indicate a power mode of the vehicle 10 (FIG. 1), for example, accessory, run, off, etc. The transmission range can indicate a range of a transmission of the vehicle 10 (FIG. 1), for example, park, drive 1, drive, 2, drive 3, neutral, etc. The sensor data can be rain sensor data, optical sensor data, humidity sensor data, etc from the vehicle sensors 16a-16n (FIG. 1). In various embodiments, the vehicle data 38 can include off-board vehicle data (i.e., that is received from a remote location) such as, but not limited to, vehicle location, vehicle position within a car wash, car wash information, etc.

Based on the vehicle data 38, the car wash automatic detection module 30 determines a car wash mode 40. The car wash mode 40 can indicate a stage of the car wash.

Figure 3:
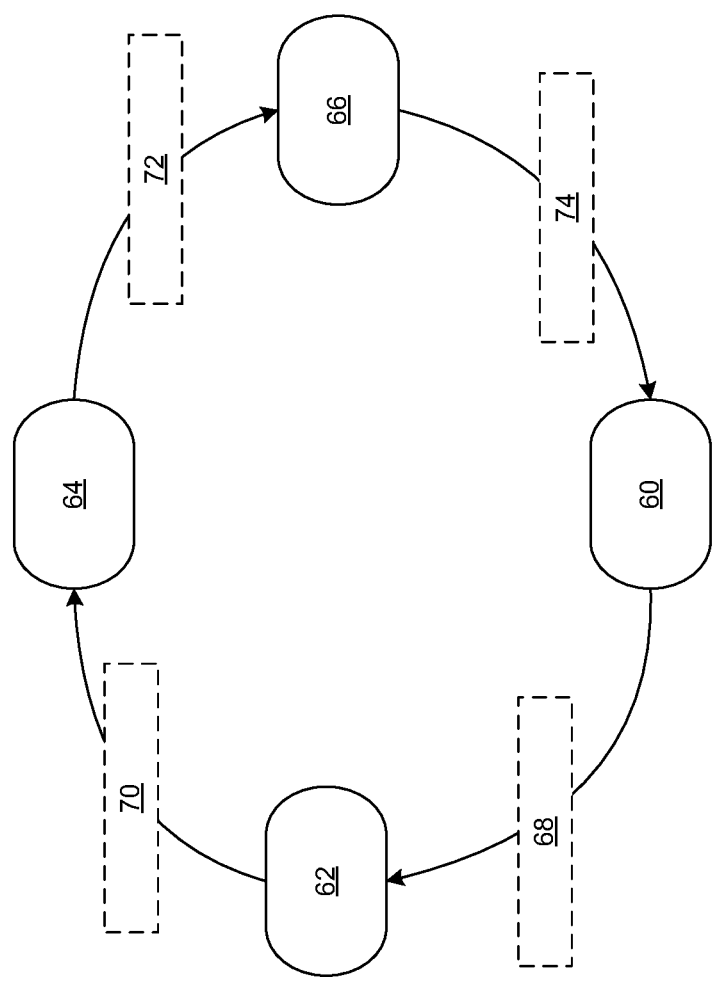
FIG. 3 is a state diagram illustrating the modes of the car wash control system in accordance with exemplary embodiments.

In various embodiments, as shown in the example of FIG. 3, the car wash mode 40 can be at least one of a not in car wash mode 60, an entering car wash mode 62, an in car wash mode 64, and an exiting car wash mode 66. The vehicle data 38 can include power mode, transmission range, vehicle speed, and sensor data.

In this example, the car wash automatic detection module 30 initializes the car wash mode 40 to the not in car wash mode 60. The car wash automatic detection module 30 sets the car wash mode 40 to the entering car wash mode 62 when the current mode is the not in car wash mode 60 and the following conditions 68 occur:

1. the power mode is at least one of run or accessory;
2. the transmission range is neutral for a predetermined time;
3. the vehicle speed is less than a predetermined speed; and
4. optical sensor, or humidity sensor data indicates the vehicle 10 (FIG. 1) is inside the car wash. (e.g., the humidity sensor indicates a humidity level above a calibrated value and/or the optical sensor indicates the windshield is wet based on an amount of light reflected back to the sensor.)

The car wash automatic detection module 30 sets the car wash mode 40 to the in car wash mode 64 when the current mode is the entering car wash mode 62 and the following conditions 70 occur:

1. the power mode is at least one of run or accessory;
2. the transmission range is neutral for a predetermined time (e.g., a predetermined time greater than for the entering car wash mode 62);
3. the vehicle speed is less than a predetermined speed; and
4. optical sensor, or humidity sensor data indicates the vehicle 10 (FIG. 1) is inside the car wash (e.g., the humidity sensor indicates a humidity level above a calibrated value and/or the optical sensor indicates the windshield is wet based on an amount of light reflected back to the sensor.)

The car wash automatic detection module 30 sets the car wash mode 40 to the exiting car wash mode 66 when the current mode is the in car wash mode 64 and the following conditions 72 occur:

1. the transmission range has changed from neutral to a drive range; and
2. the vehicle speed is greater than a predetermined speed.

The car wash automatic detection module 30 sets the car wash mode 40 to the not in car wash mode 60 when the current mode is the exiting car wash mode 66 and the following conditions 74 occur:

1. the vehicle speed is greater than a predetermined speed (e.g., a predetermined speed greater than for the exiting car wash mode 66); or
2. optical sensor, or humidity sensor data indicates the vehicle is outside the car wash (e.g., the humidity sensor indicates a humidity level above a calibrated value and/or the optical sensor indicates the windshield is wet based on an amount of light reflected back to the sensor.)

With reference back to FIG. 2, the user configuration module 32 receives as input user input 42. The user configuration module 32 determines user configured parameters 46 based on the user input 42. For example, the user configuration module 32 can generate interface data 44 to display a user interface to a user (e.g., a visual user interface, an audio user interface, or any other type of user interface etc.). In the example of a visual user interface, the user interface can include selection boxes, text input boxes, selection menus, or any other selection items for configuring what vehicle components 20a-20n (FIG. 1) to control (e.g., windows, windshield wipers, mirrors, running boards, antennas, etc.), how to control the vehicle components 20a-20n (e.g., extend, retract, close, etc), and during what car wash mode 60-66 to control the vehicle component 20-20n. The user interacts with the user interface to generate the user input 42. The user input 42 indicates the user's selection of vehicle components 20a-20n (FIG. 1) to control, how to control the vehicle component 20a-20n (FIG. 1), and during which car wash mode 60-66 the vehicle components 20a-20n should be controlled. The user configuration module 32 stores the user input 42 as the user configured parameters 46 in the parameters datastore 36.

The component control module 34 receives as input the car wash mode 40. Based on the car wash mode 40, the component control module 34 generates control signals 50 directly to the vehicle components 20a-20n (FIG. 1) and/or generates messages 52 to the other control modules 14b-14n such that the vehicle components 20a-20n can be controlled. In various embodiments, the component control module 34 generates the control signals 50 and/or messages 52 to control the various vehicle components 20a-20n based on predetermined parameters and/or the user configured parameters.

For example, the component control module 34 retrieves the predetermined parameters and user configured parameters 46 for the particular car wash mode 40 from the parameters datastore 36. For each vehicle component 20a-20n (FIG. 1), the component control module 34 generates the control signal 50 or message 52 based on the user configured parameters 46, if they exist, or based on predetermined parameters, if no user configured parameters 46 exist. The predetermined parameters can be default parameters set up by a vehicle manufacturer during production. For example, the default parameters can indicate that all vehicle components should be in a protection or retracted state when in the entering car wash mode 62 and the in car wash mode 64. Whereas, the user configured parameters 46 can indicate that specific vehicle components 20a-20n (FIG. 1), such as the running boards, should be in a cleaning or extended state, so that they can be cleaned during the car wash.

Figure 4:
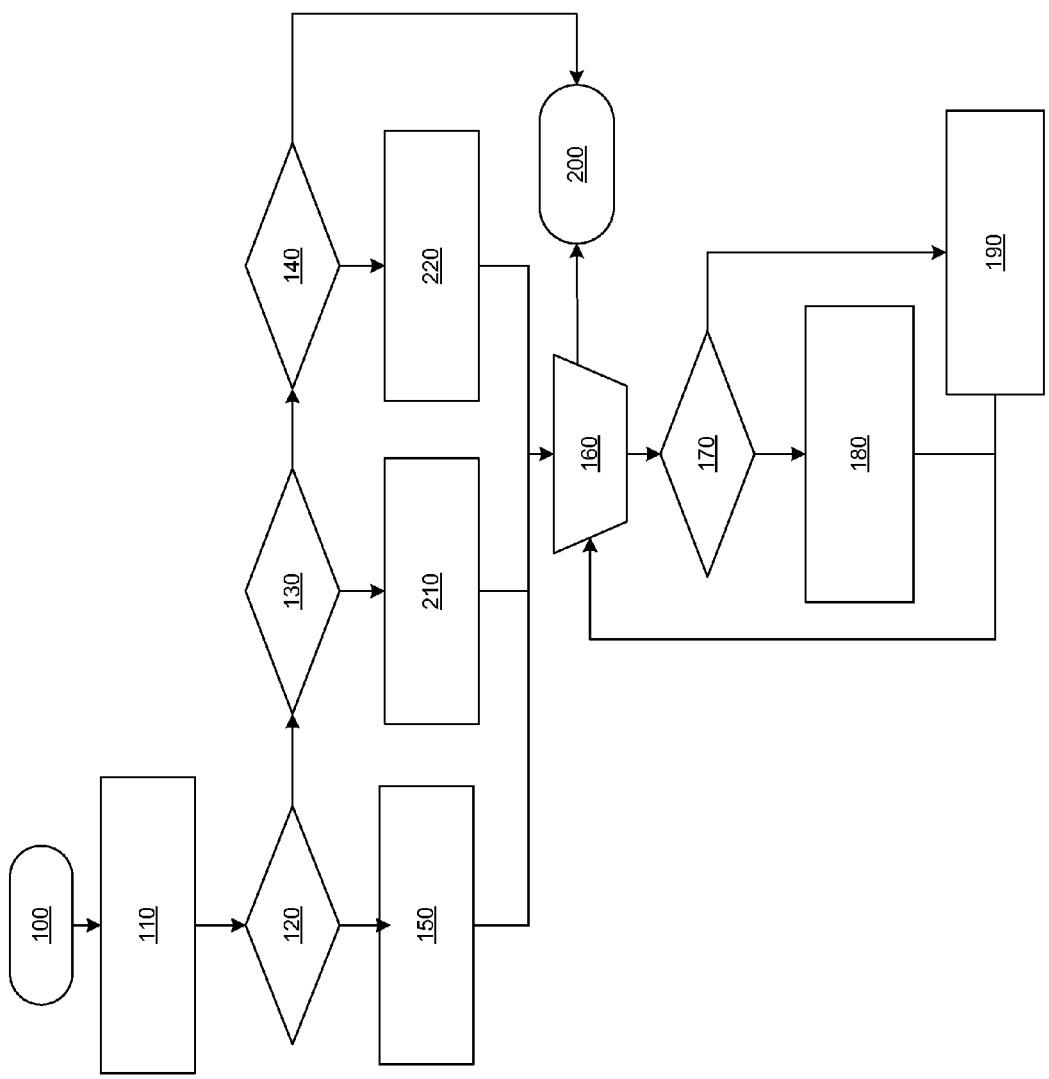
FIG. 4. is a flowchart illustrating a car wash control method in accordance with exemplary embodiments.

With reference now to FIG. 4 and with continued reference to FIGS. 2 and 3, a flowchart illustrates a car wash control method that can be performed by the control module 14a in accordance with exemplary embodiments. As can be appreciated in light of the disclosure, the order of operation within the method is not limited to the sequential execution as illustrated in FIG. 4, but may be performed in one or more varying orders as applicable and in accordance with the present disclosure.

In one example, the method may begin at 100. Conditions 68-74 as discussed with regard to FIG. 3 or other conditions are evaluated to automatically determine the car wash mode 40 at 110. The car wash mode 40 is evaluated at 120-140. If the car wash mode 40 is the entering car wash mode 62 at 120, the parameters 48 associated with the entering car wash mode 62 are retrieved from the parameters datastore 36 at 150 and control signals 50 and/or messages 52 are generated based thereon at 160-190. For example, for each vehicle component 20a-20n (FIG. 1) at 160, if user configured parameters 46 exist at 170, control signals 50 and/or messages 52 are generated based on the user configured parameters 46 at 180. If, however, user configured parameters 46 do not exist at 170, control signals 50 and/or messages 52 are generated based on the predetermined parameters at 190. Thereafter, the method may end at 200.

If, at 120, the car wash mode 40 is not the entering car wash mode 62, rather the car wash mode 40 is the in car wash mode 64 at 130, the parameters 48 associated with the in car wash mode 64 are retrieved from the parameters datastore 36 at 210 and control signals 50 and/or messages 52 are generated based thereon at 160-190. For example, for each vehicle component 20a-20n (FIG. 1) at 160, if user configured parameters 46 exist at 170, control signals 50 and/or messages 52 are generated based on the user configured parameters 46 at 180. If, however, user configured parameters 46 do not exist at 170, control signals 50 and/or messages 52 are generated based on the predetermined parameters at 190. Thereafter, the method may end 200.

If, at 120, the car wash mode 40 is not the entering car wash mode 62, and at 130, the car wash mode 40 is not the in car wash mode 64, rather the car wash mode 40 is the exiting car wash mode 66 at 140, the parameters 48 associated with the exiting car wash mode 66 are retrieved from the parameters datastore 36 at 280 and control signals 50 and/or messages 52 are generated based thereon at 160-190. For example, for each vehicle component 20a-20n (FIG. 1) at 160, if user configured parameters 46 exist at 170, control signals 50 and/or messages 52 are generated based on the user configured parameters 46 at 180. If, however, user configured parameters 46 do not exist at 170, control signals 50 and/or messages 52 are generated based on the predetermined parameters at 190. Thereafter, the method may end at 200.

If, at 120, the car wash mode 40 is not the entering car wash mode 62, the car wash mode 40 is not the in car wash mode 64 at 130, and the car wash mode 40 is not the exiting car wash mode 66 at 140, the car wash mode 40 is the not in car wash mode 60. No control signals or messages are generated and the method may end at 200.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method of controlling a vehicle, comprising:
   determining a current car wash mode from a plurality of car wash modes; and
   controlling at least one vehicle component based on the car wash mode;
   wherein the car wash mode is selected from the set consisting of entering a car wash, exiting a car wash, in a car wash, and not in a car wash; and
   wherein the determining a current car wash mode comprises determining whether a humidity level is above a calibrated value or determining whether a windshield is wet.

2. The method of claim 1, wherein the determining the car wash mode comprises:
   determining whether a power mode is at least one of run or accessory;
   determining whether a transmission range is in neutral for a predetermined time; and
   determining whether a vehicle speed is less than a predetermined speed.

3. The method of claim 2, further comprising setting a current car wash mode to the entering car wash mode.

4. The method of claim 2, further comprising setting a current car wash mode to the in car wash mode.

5. The method of claim 1, wherein the determining a current car wash mode comprises:
   determining whether the transmission range has changed from neutral to a drive range; and
   determining whether the vehicle speed is greater than a first predetermined speed.

6. The method of claim 5, wherein the determining a current car wash mode comprises:
   determining whether the vehicle speed is greater than a second predetermined speed, the second predetermined speed being greater than the first predetermined speed.

7. The method of claim 6, further comprising setting a current car wash mode to the not in car wash mode.

8. The method of claim 1, wherein the controlling the at least one vehicle component comprises controlling the at least one vehicle component to an extended state to clean the vehicle component.

9. The method of claim 1, further comprising setting a current car wash mode to the exiting car wash mode.

10. The method of claim 1:
    further comprising determining user configured parameters based on user input, and
    generating a user interface;
    wherein the user input is generated based on a user's interaction with the user interface;
    wherein the controlling the at least one vehicle component is based on the user configured parameters; and
    wherein the user configured parameters indicate at least one of: which of the at least one vehicle components to control, how to control the at least one vehicle component; and during which car wash mode of the plurality of car wash modes to control the at least one vehicle component.

11. A vehicle control system for a car wash, comprising:
    a first module that determines a current car wash mode from a plurality of car wash modes; and
    a second module that controls at least one vehicle component based on the car wash mode;
    wherein the car wash mode is selected from the set consisting of entering a car wash, exiting a car wash, in a car wash, and not in a car wash; and
    wherein the first module determines the current car wash mode by determining whether a humidity level is above a calibrated value or determining whether a windshield is wet.

12. The system of claim 11, wherein the first module determines the car wash mode by:
    determining whether a power mode is at least one of run or accessory;
    determining whether a transmission range is in neutral for a predetermined time; and
    determining whether a vehicle speed is less than a predetermined speed.

13. The system of claim 12, wherein the first module sets a current car wash mode to the entering car wash mode.

14. The system of claim 1, wherein the first module determines sets a current car wash mode to the in car wash mode.

15. The system of claim 11, wherein the first module determines a current car wash mode by:
   determining whether the transmission range has changed from neutral to a drive range; and
   determining whether the vehicle speed is greater than a first predetermined speed.

16. The system of claim 15, wherein the first module determines a current car wash mode by determining whether the vehicle speed is greater than a second predetermined speed, the second predetermined speed being greater than the first predetermined speed.

17. The system of claim 11, wherein the second module controls the at least one vehicle component to an extended state to clean the vehicle component.

18. The system of claim 11, wherein the first module sets a current car wash mode to the exiting car wash mode.

19. The system of claim 11:
   further comprising a third module that determines user configured parameters based on user input;
   wherein the second module controls the at least one vehicle component based on the user configured parameters;
   wherein the third module generates a user interface;
   wherein the user input is generated based on a user's interaction with the user interface; and
   wherein the user configured parameters indicate at least one of: which of the at least one vehicle components to control; how to control the at least one vehicle component; and during which car wash mode of the plurality of car wash modes to control the at least one vehicle component.

20. The system of claim 11, wherein the first module sets a current car wash mode to the not in car wash mode.

* * * * *